(12) United States Patent
Gal et al.

(10) Patent No.: US 8,758,493 B2
(45) Date of Patent: Jun. 24, 2014

(54) CHILLED AMMONIA BASED $CO_2$ CAPTURE SYSTEM WITH WATER WASH SYSTEM

(75) Inventors: Eli Gal, Cupertino, CA (US); Indira Jayaweera, Fremont, CA (US)

(73) Assignee: ALSTOM Technology Ltd, Baden (CH)

( * ) Notice: Subject to any disclaimer, the term of this patent is extended or adjusted under 35 U.S.C. 154(b) by 124 days.

(21) Appl. No.: 12/942,195

(22) Filed: Nov. 9, 2010

(65) Prior Publication Data
US 2011/0048239 A1    Mar. 3, 2011

Related U.S. Application Data

(62) Division of application No. 12/556,043, filed on Sep. 9, 2009, now Pat. No. 7,846,240.

(60) Provisional application No. 61/102,137, filed on Oct. 2, 2008, provisional application No. 61/102,217, filed on Oct. 2, 2008.

(51) Int. Cl.
*B01D 53/14*    (2006.01)

(52) U.S. Cl.
USPC ............................................. 96/290; 422/171

(58) Field of Classification Search
USPC .................. 95/156, 159, 169, 210–212, 199, 95/223–225, 229, 232, 236; 96/234, 243, 96/290, 296–300; 423/220, 235, 237, 238, 423/234; 422/177, 171; 261/115
See application file for complete search history.

(56) References Cited

U.S. PATENT DOCUMENTS

| | | | |
|---|---|---|---|
| 1,897,725 | A | 2/1933 | Guas et al. |
| 2,106,734 | A | 2/1935 | Gollmar |
| 2,043,109 | A | 6/1936 | McKee et al. |
| 2,487,576 | A | 11/1949 | Meyers |
| 2,608,461 | A | 8/1952 | Frazier |
| 2,878,099 | A | 3/1959 | Breuing et al. |

(Continued)

FOREIGN PATENT DOCUMENTS

| | | |
|---|---|---|
| AU | 648129 | 7/1992 |
| AU | 678622 | 6/1995 |

(Continued)

OTHER PUBLICATIONS

A.C. Yeh, H. Bai: "Comparison of ammonia and monoethanolamine solvents to reduce CO2 greenhouse gas emissions" The Science of the Total Environment, vol. 338, 1999, pp. 121-133, XP002529608.

(Continued)

*Primary Examiner* — Frank Lawrence, Jr.
(74) *Attorney, Agent, or Firm* — Robert D. Crawford

(57) ABSTRACT

A method and system for reducing an amount of ammonia in a flue gas stream. The system 100 includes: a wash vessel 180 for receiving an ammonia-containing flue gas stream 170, the wash vessel 180 including a first absorption stage 181*a* and a second absorption stage 181*b*, each of the first absorption stage 181*a* and the second absorption stage 181*b* having a mass transfer device 184; and a liquid 187 introduced to the wash vessel 180, the liquid 187 for absorbing ammonia from the ammonia-containing flue gas stream 170 thereby forming an ammonia-rich liquid 192 and a reduced ammonia containing flue gas stream 190 exiting the wash vessel 180.

16 Claims, 3 Drawing Sheets

(56) References Cited

U.S. PATENT DOCUMENTS

| | | | |
|---|---|---|---|
| 3,112,177 A | | 11/1963 | Fujise et al. |
| 3,227,429 A | | 1/1966 | Renzi |
| 3,255,233 A | | 6/1966 | Kunze et al. |
| 3,819,816 A | | 6/1974 | Wunderlich et al. |
| 3,923,955 A | | 12/1975 | Fattinger |
| 4,002,722 A | * | 1/1977 | Suzuki et al. ............... 423/238 |
| 4,149,857 A | * | 4/1979 | Volke et al. ............... 95/180 |
| 4,342,731 A | * | 8/1982 | Ritter ............... 423/234 |
| 4,488,884 A | * | 12/1984 | Parigi ............... 95/199 |
| 4,515,760 A | | 5/1985 | Lang et al. |
| 4,847,057 A | | 7/1989 | Brugerolle et al. |
| 4,977,745 A | | 12/1990 | Heichberger |
| 4,999,031 A | | 3/1991 | Gerhardt et al. |
| 5,067,972 A | | 11/1991 | Hemmings et al. |
| 5,137,550 A | | 8/1992 | Hegarty et al. |
| 5,186,916 A | | 2/1993 | Nevels |
| 5,230,877 A | * | 7/1993 | Eimer et al. ............... 423/359 |
| 5,302,361 A | * | 4/1994 | Nagl ............... 423/220 |
| 5,318,758 A | | 6/1994 | Fujii |
| 5,378,442 A | | 1/1995 | Fujii et al. |
| 5,427,759 A | | 6/1995 | Heitmann |
| 5,453,115 A | | 9/1995 | Vuletić |
| 5,462,583 A | | 10/1995 | Wood et al. |
| 5,599,508 A | | 2/1997 | Martinelli et al. |
| 5,624,649 A | * | 4/1997 | Gal ............... 423/243.11 |
| 5,648,053 A | | 7/1997 | Mimura et al. |
| 5,700,311 A | | 12/1997 | Spencer |
| 5,756,058 A | | 5/1998 | Watanabe et al. |
| 5,832,712 A | | 11/1998 | Rønning et al. |
| 5,853,680 A | | 12/1998 | Iijima et al. |
| 5,979,180 A | | 11/1999 | Lebas et al. |
| 6,019,810 A | * | 2/2000 | Phillips et al. ............... 55/512 |
| 6,027,552 A | | 2/2000 | Ruck et al. |
| 6,210,467 B1 | | 4/2001 | Howard |
| 6,312,503 B1 | * | 11/2001 | Fike et al. ............... 95/211 |
| 6,348,088 B2 | | 2/2002 | Chung |
| 6,372,023 B1 | | 4/2002 | Kiyono et al. |
| 6,458,188 B1 | | 10/2002 | Mace |
| 6,485,547 B1 | | 11/2002 | Iijima |
| 6,497,852 B2 | | 12/2002 | Chakravarti et al. |
| 6,506,350 B2 | | 1/2003 | Cooper et al. |
| 6,585,807 B2 | * | 7/2003 | Umino et al. ............... 95/178 |
| 6,759,022 B2 | | 7/2004 | Hammer et al. |
| 6,764,530 B2 | | 7/2004 | Iijima |
| 7,022,296 B1 | | 4/2006 | Khang et al. |
| 7,083,662 B2 | | 8/2006 | Xu et al. |
| 7,128,777 B2 | | 10/2006 | Spencer |
| 7,160,456 B2 | | 1/2007 | Järventie |
| 7,255,842 B1 | | 8/2007 | Yeh et al. |
| 7,485,275 B2 | | 2/2009 | Asprion et al. |
| 2003/0045756 A1 | | 3/2003 | Mimura et al. |
| 2003/0140786 A1 | | 7/2003 | Iijima |
| 2004/0123736 A1 | | 7/2004 | Torres, Jr. et al. |
| 2004/0126294 A1 | | 7/2004 | Cooper et al. |
| 2005/0169825 A1 | | 8/2005 | Cadours et al. |
| 2006/0178259 A1 | | 8/2006 | Schubert et al. |
| 2006/0204425 A1 | | 9/2006 | Kamijo et al. |
| 2007/0006565 A1 | | 1/2007 | Fleischer et al. |
| 2008/0072762 A1 | | 3/2008 | Gal |
| 2008/0178733 A1 | | 7/2008 | Gal |
| 2008/0307968 A1 | | 12/2008 | Kang et al. |
| 2009/0101012 A1 | | 4/2009 | Gal et al. |
| 2009/0155889 A1 | | 6/2009 | Handagama et al. |
| 2009/0282977 A1 | | 11/2009 | Koss |

FOREIGN PATENT DOCUMENTS

| | | |
|---|---|---|
| AU | 693998 | 10/1996 |
| AU | 704708 | 6/1997 |
| AU | 720931 | 2/1998 |
| AU | 733148 | 3/1998 |
| AU | 748293 | 10/2001 |
| AU | 2002300888 | 6/2003 |
| AU | 2002300893 | 6/2003 |
| AU | 2002325051 | 4/2004 |
| AU | 2002348259 | 6/2004 |
| DE | 469840 | 12/1928 |
| DE | 2832493 | 7/1978 |
| DE | 3633690 | 4/1988 |
| DE | 10 2005 033837 | 1/2007 |
| EP | 0243778 | 11/1987 |
| EP | 0502596 | 9/1992 |
| EP | 0553643 | 8/1993 |
| EP | 0588178 | 3/1994 |
| EP | 1759756 | 3/2007 |
| GB | 271852 | 5/1926 |
| GB | 871207 | 6/1961 |
| GB | 899611 | 6/1962 |
| GB | 2331526 | 5/1999 |
| JP | 10 202054 | 8/1998 |
| JP | 11 137960 | 5/1999 |
| JP | 2006-055824 | 3/2006 |
| KR | 100703999 B1 | 3/2007 |
| SU | 512785 | 5/1976 |
| SU | 1567251 | 5/1990 |
| WO | 98/47604 | 10/1998 |
| WO | 02/089958 | 11/2002 |
| WO | 03/057348 | 7/2003 |
| WO | 03/089115 | 10/2003 |
| WO | 03/095071 | 11/2003 |
| WO | 2004/005818 | 1/2004 |
| WO | 2004/030795 | 4/2004 |
| WO | 2004/052511 | 6/2004 |
| WO | 2004/058384 | 7/2004 |
| WO | 2005/087351 | 9/2005 |
| WO | 2006/022885 | 3/2006 |
| WO | 2008/094777 | 8/2008 |
| WO | 2008/101293 | 8/2008 |
| WO | 2008/144918 | 12/2008 |
| WO | 2010/053683 | 5/2010 |

OTHER PUBLICATIONS

Removal of Carbon Dioxide from Flue Gas by Ammonia Carbonation in the Gas Phase, Xiaonian Li, Edward Hagaman, Costas Tsouris, and James W. Lee, Energy & Fuels 2003, 17, 69-74.

Schussler et al., "Carbon Dioxide Removal from Fossil Fuel Power Plants by Refrigeration Under Pressure", IEEE, 1989.

Resnik et al., "Aqua Ammonia Process for Simultaneous Removal of CO2, SO2 and NO$_x$," Int. J. Environmental Tech. and Management, May 31, 2004 (approx.), pp. 89-104, vol. 4, Nos. 1/2.

Andrea Corti et al., "Reduction of Carbon Dioxide emissions from a SCGT/CC by Ammonia Solution Absorption Preliinary Results" International Journal of Thermodynamics, International Centre for Applied Thermodynamics, Istanbul, TR, vol. 7, No. 4, Dec. 1, 2004, pp. 173-181.

Communication Pursuant to Article 94(3) EPC, dated Nov. 22, 2012, for EP 09793012.7.

* cited by examiner

CHILLED AMMONIA BASED CO₂ CAPTURE SYSTEM WITH WATER WASH SYSTEM

CROSS REFERENCE TO RELATED APPLICATIONS

This application is a divisional of U.S. patent application Ser. No. 12/556,043, filed Sep. 9, 2009, now U.S. Pat. No. 7,846,240, which claims the benefit of U.S. provisional application No. 61/102,137 filed on Oct. 2, 2008 and U.S. provisional application No. 61/102,217 filed on Oct. 2, 2008, the contents of each of which are incorporated herein by reference in their entireties.

FIELD

The disclosed subject matter relates to a system and method for removing carbon dioxide ($CO_2$) and ammonia ($NH_3$) from a flue gas stream. More specifically, the disclosed subject matter relates to a system and method employing a multi-stage wash vessel for removing ammonia from a flue gas stream that has been subjected to a $CO_2$ removal system and process.

BACKGROUND

Most of the energy used in the world is derived from the combustion of carbon and hydrogen-containing fuels such as coal, oil and natural gas. In addition to carbon and hydrogen, these fuels contain oxygen, moisture and contaminants such as ash, sulfur (often in the form of sulfur oxides, referred to as "SOx"), nitrogen compounds (often in the form of nitrogen oxides, referred to as "NOx"), chlorine, mercury, and other trace elements. Awareness regarding the damaging effects of the contaminants released during combustion triggers the enforcement of ever more stringent limits on emissions from power plants, refineries and other industrial processes. There is an increased pressure on operators of such plants to achieve near zero emission of contaminants.

Numerous processes and systems have been developed in response to the desire to achieve near zero emission of contaminants. Systems and processes include, but are not limited to desulfurization systems (known as wet flue gas desulfurization "WFGD" and dry flue gas desulfurization "DFGD"), particulate filters (including, for example, bag houses, particulate collectors, and the like), as well as the use of one or more sorbents that absorb contaminants from the flue gas. Examples of sorbents include, but are not limited to, activated carbon, ammonia, limestone, and the like.

It has been shown that ammonia efficiently removes $CO_2$, as well as other contaminants, such as sulfur dioxide ($SO_2$) and hydrogen chloride (HCl), from a flue gas stream. In one particular application, absorption and removal of $CO_2$ from a flue gas stream with ammonia is conducted at a low temperature, for example, between 0 and 20 degrees Celsius (0°-20° C.). To safeguard the efficiency of the system, and to comply with emission standards, maintenance of the ammonia within the flue gas stream treatment system is desired.

SUMMARY

According to aspects illustrated herein, there is provided a system for reducing an amount of ammonia in a flue gas stream, the system comprising: a wash vessel for receiving an ammonia-containing flue gas stream, the wash vessel including a first absorption stage and a second absorption stage, each of the first absorption stage and the second absorption stage having a mass transfer device; and a liquid introduced to the wash vessel, the liquid for absorbing ammonia from the ammonia-containing flue gas stream thereby forming an ammonia-rich liquid and a reduced ammonia containing flue gas stream exiting the wash vessel.

According to other aspects illustrated herein, there is provided a system for reducing an amount of ammonia in a flue gas stream, the system comprising: an absorbing system having one or more absorbers to absorb carbon dioxide ($CO_2$) from a cooled flue gas stream having a temperature below ambient temperature, the absorbing system operates at a temperature between 0° and 20° Celsius, wherein at least a portion of the $CO_2$ is absorbed by an ammoniated solution or slurry thereby producing an ammonia-containing flue gas stream; and a wash vessel configured to receive at least a portion of the ammonia-containing flue gas stream, the wash vessel includes one or more absorption stages, each of the one or more absorption stages having a spray head system and a mass transfer device selected from random packing material, hydrophilic packing material, and structural packing, wherein the spray head system directs a liquid in a direction countercurrent to a direction of the ammonia-containing flue gas stream, the liquid absorbing ammonia from the ammonia-containing flue gas stream and thereby forming an ammonia-rich liquid and a reduced-ammonia flue gas stream, whereby at least a portion of ammonia present in the ammonia-containing flue gas stream is removed from the ammonia-containing flue gas stream in the one or more absorption stages of the wash vessel.

According to other aspects illustrated herein, there is provided a method of reducing an amount of ammonia from a flue gas stream, the method comprising: introducing a cooled flue gas stream having a temperature below ambient temperature to an absorbing system, wherein the absorbing system operates at a temperature between 0° and 20° Celsius; contacting the cooled flue gas stream in the absorbing system with an ammoniated slurry or solution, wherein the ammoniated slurry or solution removes carbon dioxide ($CO_2$) from the cooled flue gas stream thereby forming an ammonia-containing flue gas stream; and introducing at least a portion of the ammonia-containing flue gas stream to a wash vessel, the wash vessel having one or more absorption stages to absorb ammonia from the ammonia-containing flue gas stream thereby reducing an amount of ammonia in a flue gas stream exiting the wash vessel.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

Figure 1:
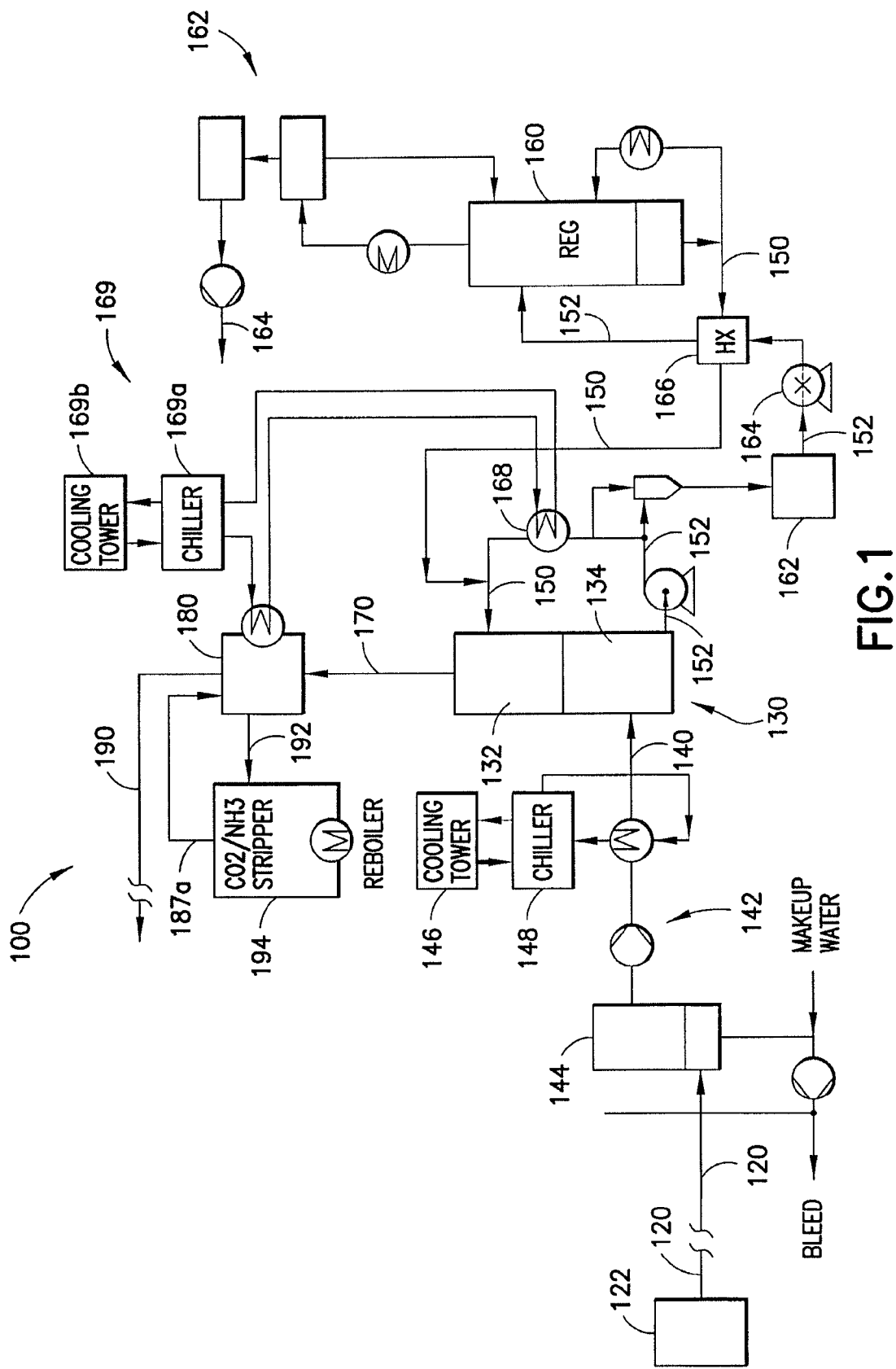
FIG. 1 is a schematic representation of a system used to reduce an amount of $CO_2$ and ammonia present in a flue gas stream.

In one embodiment, as shown in FIG. 1, a system 100 for reducing an amount of ammonia ($NH_3$) and carbon dioxide ($CO_2$) present in a flue gas stream includes several devices and processes for removing a variety of contaminants from a flue gas stream 120 generated by combustion of a fuel in a furnace 122. As shown in FIG. 1, system 100 includes an absorbing system 130 to absorb carbon dioxide ($CO_2$) from the flue gas stream 120 and, in one embodiment, a cooled flue gas stream 140.

Cooled flue gas stream 140 is generated by passing the flue gas stream 120 generated by the combustion of a fuel in a furnace 122 to a cooling system 142. Before introduction to the cooling system 142, flue gas stream 120 may undergo treatment to remove contaminants therefrom, such as, for example, a flue gas desulfurization process and particulate collector, (not shown).

Cooling system 142 may be any system that can produce cooled flue gas stream 140, and may include, as shown in FIG. 1, a direct contact cooler 144, one or more cooling towers 146 and one or more chillers 148, that wash and/or scrub the flue gas stream 120, capture contaminants, and/or lower the moisture content of the flue gas stream. However, it is contemplated that cooling system 142 may include less or more devices than are shown in FIG. 1.

In one embodiment, the cooled flue gas stream 140 has a temperature that is lower than the ambient temperature. In one example, cooled flue gas stream 140 may have a temperature between about zero degrees Celsius and about twenty degrees Celsius (0° C.-20° C.). In another embodiment, the cooled flue gas stream 140 may have a temperature between about zero degrees Celsius and about ten degrees Celsius (0° C.-10° C.).

As shown in FIG. 1, cooling system 142 is in communication with the absorbing system 130. It is contemplated that the cooling system 142 may be in direct communication with the absorbing system 130, i.e., there are no additional processes or devices between the cooling system and the absorbing system. Alternatively, the cooling system 142 may be in indirect communication with the absorbing system 130, i.e., there may be additional processes or devices between the cooling system and the absorbing system, such as, but not limited to, particulate collectors, mist eliminators, and the like.

Absorbing system 130 facilitates the absorption of $CO_2$ from the cooled flue gas stream 140 by contacting the cooled flue gas stream with an ammoniated solution or slurry 150. Ammoniated solution or slurry 150 may include dissolved ammonia and $CO_2$ species in a water solution and may also include precipitated solids of ammonium bicarbonate.

In one embodiment, absorbing system 130 includes a first absorber 132 and a second absorber 134. However, it is contemplated that absorbing system 130 may include more or less absorbers as illustrated in FIG. 1. Additionally, it is contemplated that first absorber 132 and/or second absorber 134 may have one or more stages therein for absorbing $CO_2$ from the cooled flue gas stream 140.

The ammoniated solution or slurry 150 introduced to the absorbing system 130 may be recycled and/or provided by a regeneration tower 160. As shown in FIG. 1, ammoniated solution or slurry 150 may be introduced to the absorbing system 130 at a location within the first absorber 132, however it is contemplated that the ammoniated solution or slurry may also be introduced at a location within the second absorber 134 or any of the absorbers present in the absorbing system 130. Regeneration tower 160 is in direct or indirect communication with absorbing system 130.

Figure 2:
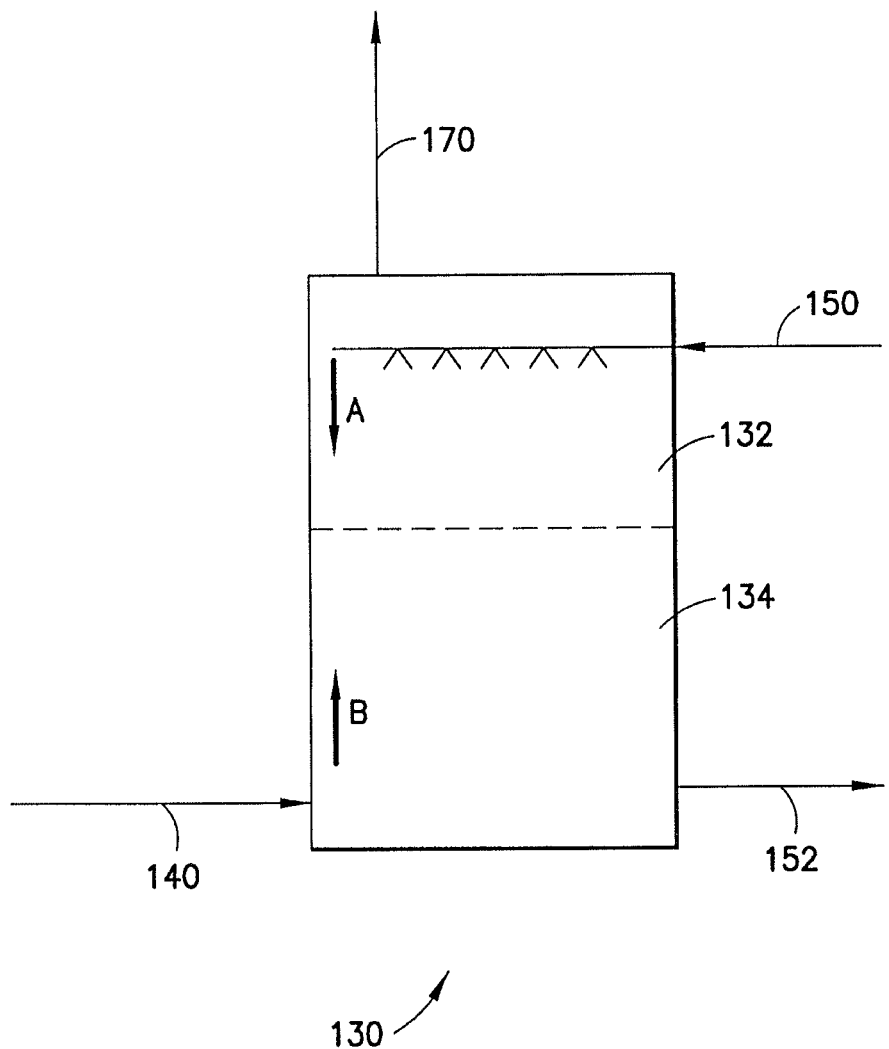
FIG. 2 is an illustration of one embodiment of an absorbing system utilized in the system depicted in FIG. 1.

As shown in more detail in FIG. 2, ammoniated slurry or solution 150 is introduced to absorbing system 130, e.g., in first absorber 132 or second absorber 134, in a direction A that is countercurrent to a flow B of cooled flue gas stream 140. As the ammoniated slurry or solution 150 contacts cooled flue gas stream 140, $CO_2$ present in the cooled flue gas stream is absorbed and removed therefrom, thereby forming a $CO_2$-rich stream 152. At least a portion of the resulting $CO_2$-rich stream 152 is transported from the absorbing system 130 to regeneration tower 160.

It is contemplated that either a portion or all of $CO_2$ rich stream 152 may be transferred to regeneration tower 160. As shown in FIG. 1, at least a portion of $CO_2$-rich stream 152 may pass through a buffer tank 162, a high pressure pump 164 and a heat exchanger 166 prior to being introduced to regeneration tower 160. In one embodiment, a separate portion of the $CO_2$-rich stream 152 may be passed from absorbing system 130 through a heat exchanger 168 where it is cooled prior to being returned to the absorbing system. Heat exchanger 168 is in communication with a cooling system 169. As shown in FIG. 1, the cooling system 169 may have a direct contact chiller 169a as well as a cooling tower 169b; however, it is recognized the cooling system 169 may have more or less devices than what is illustrated herein. The $CO_2$-rich stream 152 is cooled prior to it being introduced into the absorbing system 130 with the ammoniated solution or slurry 150.

Additionally, while not shown in FIG. 1 or 2, it is also contemplated that the portion of the $CO_2$-rich stream 152 may be transferred directly to the regeneration tower 160 without passing through the buffer tank 162, the high pressure pump 164 and the heat exchanger 166.

Regeneration tower 160 regenerates the $CO_2$-rich stream 152 to form the ammoniated slurry or solution 150 that is introduced to the absorbing system 130. Regeneration tower 160 facilitates the regeneration of used ammoniated solution or slurry, i.e., the $CO_2$-rich stream 152, which has been through the absorbing system 130 and removed $CO_2$. Regeneration is performed by providing heat at the bottom of the regeneration tower 160. Regeneration of the $CO_2$-rich stream 152 is also performed at high pressure.

The capacity of the ammoniated solution or slurry 150 to absorb $CO_2$ from the cooled flue gas stream 140 depends on, e.g., the ammonia concentration in the ammoniated solution or slurry, the $NH3/CO_2$ mole ratio, and the temperature and pressure of the absorbing system 130. In one embodiment, the $NH3/CO_2$ mole ratio for absorption of $CO_2$ is between about 1.0 and about 4.0. In another embodiment, the $NH3/CO_2$ mole ratio for absorption of $CO_2$ is between about 1.0 and about 3.0. Additionally, in one embodiment, the absorbing system 130 operates at a low temperature, particularly at a temperature less than about twenty degrees Celsius (20° C.). In one embodiment, the absorbing system 130 operates at a temperature between about zero degrees Celsius and about twenty degrees Celsius (0° and 20° C.). In another embodiment, the absorbing system 130 operates at a temperature between about zero degrees Celsius and about ten degrees Celsius (0° and 10° C.).

As shown in FIGS. 1 and 2, and discussed above, after cooled flue gas stream 140 contacts ammoniated solution or slurry 150, $CO_2$-rich stream 152 is formed, as well as an ammonia-containing flue gas stream 170. Typically, the concentration of ammonia in the ammonia-containing flue gas stream 170 will vary depending on the system, the amount of ammoniated solution or slurry 150 introduced to the absorbing system 130, and the amount of the $CO_2$ present in the cooled flue gas stream 140, and therefore, the ammonia-containing flue gas stream may contain any concentration of ammonia. In one embodiment, the concentration of ammonia in the ammonia-containing flue gas stream 170 may be between about five hundred parts per million (500 ppm) and about thirty thousand parts per million (30,000 ppm).

It is contemplated that the concentration of ammonia present in the ammonia-containing flue gas stream 170 may be measured. For example, the ammonia concentration in the ammonia-containing flue gas stream 170 may be measured by, for example, a dragger tube or Fourier transform infrared spectroscopy (FTIR). While not shown, the amount or concentration of ammonia in the ammonia-containing flue gas stream 170 may be measured at any point prior to its introduction to a wash vessel 180. Measurement of the amount or concentration of the ammonia in the ammonia-containing flue gas stream 170 may assist the operator of system 100 in removing or reducing the amount of ammonia in the ammonia-containing flue gas stream.

As shown in FIG. 1, ammonia-containing flue gas stream 170 is introduced to the wash vessel 180. In one embodiment, wash vessel 180 reduces an amount of ammonia present in the ammonia-containing flue gas stream 170 and forms a reduced ammonia-containing flue gas stream 190. However, it is contemplated that wash vessel 180 may be used in conjunction with other systems and methods that generate a flue gas stream containing ammonia, i.e., the wash vessel may be used in a system that does not contain absorbing system 130 and/or cooling system 142.

The reduced ammonia-containing flue gas stream 190 may be released to the environment. The reduced ammonia-containing flue gas stream 190 may be directly released to the environment from wash vessel 180. However, it is contemplated that the reduced ammonia-containing flue gas stream may be further processed prior to being emitted to the environment, for example, it may be washed in an acidic solution to further reduce contaminant content. Additionally, and while not shown in FIG. 1, it is contemplated that the amount of ammonia present in the reduced ammonia-containing flue gas stream 190 may be measured after the reduced ammonia-containing flue gas stream exits the wash vessel 180.

Figure 3:
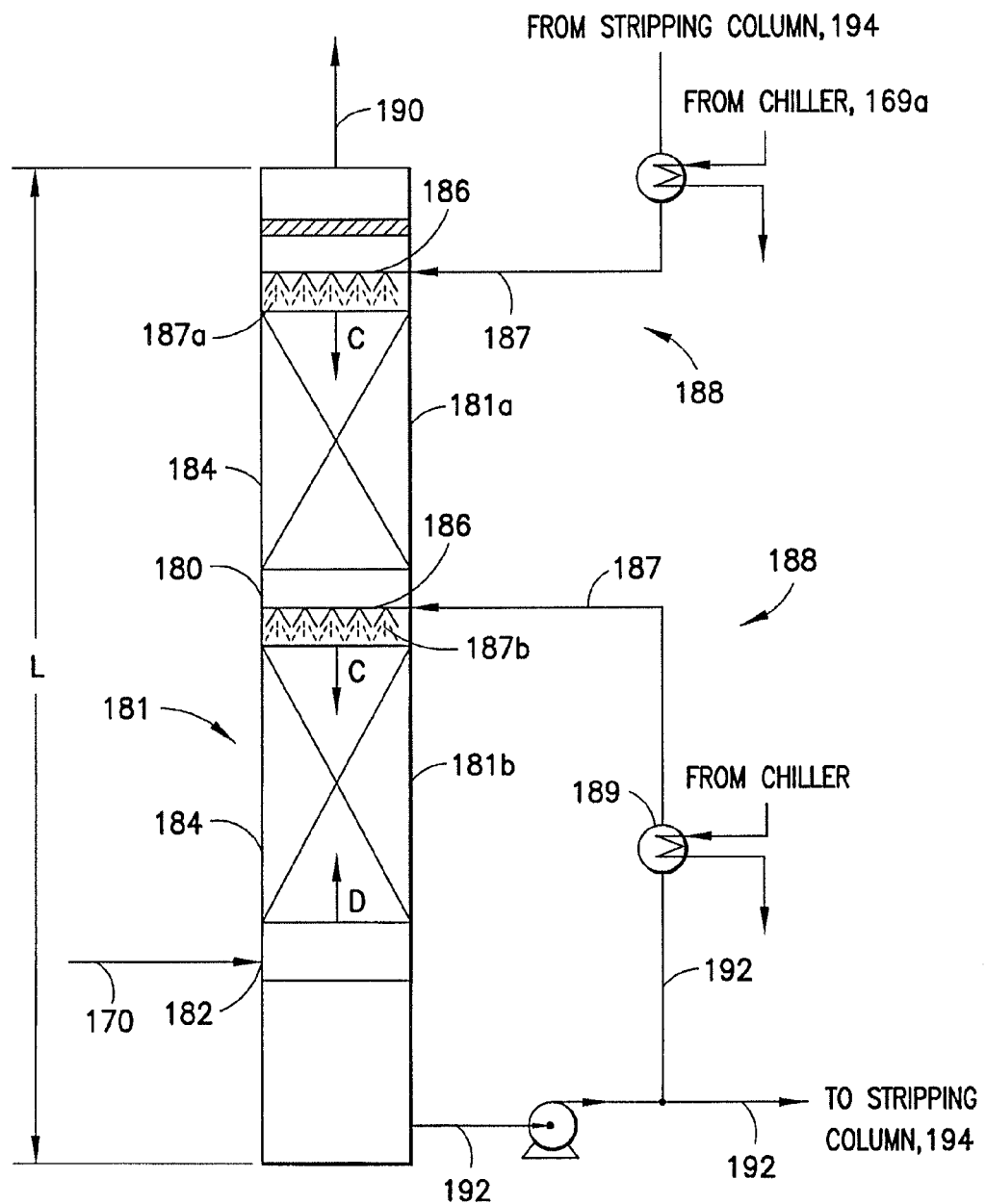
FIG. 3 is an illustration of one embodiment of a wash vessel utilized in the system depicted in FIG. 1.

In one embodiment, wash vessel 180 is configured to accept ammonia-containing flue gas stream 170. As shown in FIG. 3, wash vessel 180 may have an opening 182 at a bottom of the wash vessel that allows the ammonia-containing flue gas stream 170 to flow into the wash vessel. While the opening 182 is shown at the bottom of the wash vessel 180, it is contemplated that the opening may be at any point in the wash vessel and may vary from system to system depending on the application.

Wash vessel 180 may have one or more absorption stages, shown generally at 181, to absorb ammonia from the ammonia-containing flue gas stream 170. In one embodiment, as shown in FIG. 3, wash vessel 180 includes two absorption stages, a first absorption stage 181a and a second absorption stage 181b. The wash vessel 180 is not limited in this regard as it is contemplated that the wash vessel may have more or less absorption stages. Each of the absorption stages 181, e.g., first and second absorption stages 181a and 181b, may include a mass transfer device 184, a spray head system 186 and a liquid delivery path 188.

The mass transfer device 184 may include packing, such as, for example, random packing, hydrophilic packing, and/or structural packing. Random packing is generally known in the art and refers to packing material introduced to the absorption stage in an un-organized fashion. Examples of random packing include, but are not limited to plastic, metal and/or ceramic packing material offered in different sizes, e.g., material having varying diameters, for example, diameters ranging between about 2.5 centimeters (2.5 cm) to about 7.6 centimeters (7.6 cm) (about 1 inch to about 3 inches). Random packing material is available from many suppliers, including, but not limited to Jaeger Products Inc. (Houston, Tex., United States). Random packing material may also include wood. Hydrophilic packing includes, but is not limited to polypropylene bags.

Structural packing is generally known in the art and refers to packing material that is arranged or organized in a specific fashion. Typically, structural packing is arranged in a manner to force fluids to take a complicated path, thereby creating a large surface area for contact between the liquid and gas. Structural packing includes, but is not limited to, structures made of metal, plastic, wood, and the like. It is contemplated that different packing materials facilitate ammonia removal or reduction at different flow rates of a liquid into the wash vessel 180. Additionally, it is contemplated that the different packing materials may provide more suitable pressure drops.

In one embodiment, one of the absorption stages 181 of the wash vessel 180 includes random packing material as the mass transfer device 184 and another of the absorption stages 181 of the wash vessel 180 includes structural packing as the mass transfer device. For example, first absorption stage 181a may include random packing material as the mass transfer device 184 and second absorption stage 181b may include structural packing as the mass transfer device. It is contemplated that the ammonia-containing flue gas stream 170 enters the wash vessel 180 and passes through the second absorption stage 181b prior to passing through the first absorption stage 181a.

As shown in FIG. 3, in each of the absorption stages 181, the mass transfer device 184 is located beneath the spray head system 186. Each of the spray head system 186 in wash vessel 180 sprays a liquid 187 into the absorption stages 181. The liquid 187 is transported to the spray head system 186 via the liquid delivery path 188. The liquid delivery path 188 is a conduit that transports the liquid 187 to the spray head system 186. The liquid 187 may be any liquid suitable to facilitate the removal of ammonia from the ammonia-containing flue gas stream 170. An example of liquid 187 is water, which is known to absorb, i.e., dissolve, ammonia through interactions between the ammonia and the water.

In one particular embodiment, liquid 187 introduced to the first absorption stage 181a is liquid 187a, e.g., water provided by a stripping column 194. The liquid 187 provided to the second absorption stage 181b is liquid 187b, which is water-containing low concentration ammonia and $CO_2$ recycled from the bottom of the wash vessel 180 and passed through a heat exchanger 189.

The liquid 187 is introduced at the top of each absorption stage 181, e.g., liquid 181a is provided to the top of first absorption stage 181a and liquid 187b is provided to the top of second absorption stage 181b, of the wash vessel 180. The liquid 187 travels in a direction C down a length L of the wash vessel 180, which is countercurrent to a direction D that the ammonia-containing flue gas stream 170 travels up the length L of the wash vessel 180. As will be appreciated, the liquid 187 travels in direction C by virtue of gravity, while the ammonia-containing flue gas stream 170 travels in direction D by virtue of several factors, including pressure drops within the wash vessel 180.

As the liquid 187 travels in the direction C, it passes through the mass transfer devices 184 in each of the absorption stages 181. Likewise, as the ammonia-containing flue gas stream 170 travels in direction D, it passes through the mass transfer devices 184 in each of the absorption stages 181.

As the liquid 187 travels in direction C down the length L of the wash vessel 180, the ammonia concentration in the liquid increases, thereby forming an ammonia-rich liquid 192. Conversely, as the ammonia-containing flue gas stream 170 travels in a direction D up a length, e.g., the length L, of the wash vessel 180, the ammonia concentration in the ammonia-containing flue gas stream decreases thereby forming the reduced ammonia-containing flue gas stream 190.

For example, liquid 187a is introduced at the top of wash vessel 180 through a spray head system 186 over the first absorption stage 181a and travels in a direction C down the length L of the wash vessel. The concentration of ammonia present in the liquid 187a exiting the first absorption stage 181a is higher than the ammonia concentration of the liquid 187a entering the first absorption stage 181a since the liquid has contacted the ammonia-containing flue gas stream 170 that travels in direction D up the length L of the wash vessel and absorbed ammonia therefrom. In this embodiment, a greater percentage of ammonia in the ammonia-containing flue gas stream 170 is absorbed by the liquid 187a that flows from the first absorption stage 181a to the second absorption stage 181b as well as the liquid 187b that provided to the second absorption stage since the ammonia-containing flue gas stream is entering the wash vessel 180 at the bottom is untreated and therefore has the highest concentration of ammonia.

It should be appreciated that the amount of ammonia removed from the ammonia-containing flue gas stream 170 varies from system to system and application to application. It is contemplated that the system is designed in a manner that the ammonia concentration in the reduced ammonia containing flue gas stream 170 is low and close to an equilibrium concentration of ammonia in the gas relative to the vapor pressure of the ammonia in the liquid. The equilibrium concentration of ammonia in the flue gas stream 170 may be as low as below ten parts per million (10 ppm) and typically in the range of between about zero parts per million (0 ppm) to about two hundred parts per million (200 ppm). In one embodiment, the reduced ammonia containing flue gas stream 190 contains at least about seventy percent (70%) less ammonia as compared to a level of ammonia in the ammonia-containing flue gas stream 170. In another embodiment, the reduced ammonia containing flue gas stream 190 contains at least about seventy five percent (75%) less ammonia as compared to a level of ammonia in the ammonia-containing flue gas stream 170. In yet a further embodiment, the reduced ammonia containing flue gas stream 190 contains at least about eighty percent (80%) less ammonia as compared to a level of ammonia in the ammonia-containing flue gas stream 170. In another embodiment, the reduced ammonia containing flue gas stream 190 contains at least about eighty five (85%) less ammonia as compared to a level of ammonia in the ammonia-containing flue gas stream 170. It is contemplated that the level of ammonia in the reduced ammonia containing flue gas stream 190 may be about ninety percent (90%), ninety five percent (95%), ninety nine percent (99%) or ninety nine and a half percent (99.5%) less than the level of ammonia in the ammonia-containing flue gas stream 170.

A flow rate of liquid 187 suitable to reduce the amount of ammonia in the flue gas varies from system to system. In one embodiment, the flow rate is suitable to reduce an amount of ammonia in the flue gas to an amount close to the equilibrium concentration and typically to below two hundred parts per million (200 ppm) in the flue gas stream. In another embodiment, the flow rate is suitable to reduce an amount of ammonia in the flue gas from about two thousand parts per million (2000 ppm) to between about seventy parts per million and about one hundred parts per million (70-100 ppm). In another embodiment, the flow rate of the liquid 187 is between about 1.8 liters per minute (1.8 lpm, or about 0.5 gallons per minute) to about 7.5 liters per minute (7.5 lpm or about 2 gallons per minute) per one thousand cubic feet per minute (1000 cfm) of flue gas.

Still referring to FIG. 3, the liquid 187 falls to the bottom of the wash vessel 180 and is removed therefrom as ammonia-rich liquid 192. As shown in FIG. 3, in one embodiment, a portion of the ammonia-rich liquid 192 is recycled to the wash vessel 180 as liquid 187 and a portion of the ammonia-rich liquid is sent to the stripping column 194 (shown in FIG. 1). For example, a portion of the ammonia-rich liquid 192 is cooled in a heat exchanger 189 and recycled to second absorption stage 181b as liquid 187b. While not illustrated, it is contemplated that a portion of the ammonia-rich liquid 192 may be recycled from the bottom of the wash vessel 180 to first absorption stage 181a as liquid 187a. Additionally, while not shown, it is contemplated that the entire amount of the ammonia-rich liquid 192 may be sent to the stripping column 194 and then returned to the wash vessel 180 as liquid 187a.

Still referring to FIG. 3, the portion of ammonia-rich liquid 192 sent to stripping column 194 is regenerated to form liquid 187a which is introduced via spray head system 186 in first absorption stage 181a. In the stripping column 194, the ammonia, as well as other contaminants, such as $CO_2$, is removed from the ammonia-rich liquid 192 to form the liquid 187a, which may be water, or water having, for example, trace contaminants of ammonia. When introduced in this manner, the liquid 187a that is introduced to the first absorption stage 181a is referred to as "once through liquid" since it is "clean liquid" that has not been recycled from the bottom of the wash vessel 180.

In one embodiment, stripping column 194 utilizes steam to remove ammonia, as well as other contaminants, from the ammonia-rich liquid 192 to form the liquid 187 that will be introduced to the wash vessel 180. However, it is contemplated that stripping column 194 may utilize other technology or techniques in order to remove the ammonia and other contaminants from the ammonia-rich liquid 192. In one embodiment, the stripping column 194 may be operated at vacuum conditions to reduce the temperature of the steam utilized in the stripping column.

While not shown in FIG. 1, it is contemplated that the ammonia removed from ammonia-rich liquid 192 may be re-utilized within system 100. For example, the ammonia may be introduced in the absorbing system 130 as ammoniated solution or slurry 150. However, it is contemplated that the ammonia may be utilized at other points inside and outside of system 100.

The amount of ammonia released to the environment is reduced or substantially eliminated by passing an ammonia-containing flue gas stream through wash vessel 180. The amount of liquid 187 introduced to the various absorption stages 181, e.g., liquid 187a introduced to the first absorption stage 181a and liquid 187b introduced to the second absorption stage 181b, may be controlled either continually or at predetermined time periods, to some extent by an operator, depending on, for example, the amount or flow of flue gas introduced to the wash vessel, a level of contaminants measured within emission from the system 100, and the like. The ability to control an amount of water used in the system may facilitate the savings of resources and reduce operating expenses.

The following examples illustrate one or more embodiments described herein. The examples are not meant to limit the subject matter disclosed herein, but rather to illustrate one or more of the embodiments.

EXAMPLES

Example 1

Four trials (runs 95, 98, 99 and 100) are conducted in a system having a wash vessel that includes 1-inch (2.54 cm)

random Jaeger packing (available from Jaeger Products Inc., Houston, Tex., United States) in the first absorption stage 181a as shown in FIG. 3. A summary of the results is provided in Tables 1-4.

Inlet ammonia concentration of the ammonia-containing flue gas stream entering the wash vessel varies between fifteen hundred and six thousand parts per million (1500-6000 ppm) at a constant gas flow rate. The tests are conducted with a flue gas stream containing ammonia as described above and a $CO_2$ concentration in the range of 0-2.3 v/v %. Liquid introduced to the wash vessel is water having a temperature between 1-5° C., and the water flow rate is between 2 and 6.5 lpm.

TABLE 1

Trial No. 95
WATER WASH

| CO2 v/v % | [NH3]g inlet[#] ppmv | [NH3]g outlet[#] ppmv | Liquid Flow lpm | Gas Flow acfm | Water Temp (C.) | delta P WW inch-water | Run Time min |
|---|---|---|---|---|---|---|---|
| 0 | 6800 | 1200-1300 | 6.5 | 731 | 1.7 | ~9 | ~25 |
| 1.9 | 5500 | 650 | 6.5 | 730 | | ~9 | 30 |
| 1.9 | 5000 | 450 | 6.5 | 730-740 | 1.5 to 2 | ~9 | 39 |
| 0 | 3100 | 850 | ~3 | 740 | 1.4 | 9.2 | 62 |
| 5.82 | 2000 | 80 | ~3 | 211 | 1.3 | 4.1 | 80 |
| ~1.9 | 2000 | 160 | ~3 | 725 | 1 to 2 | ~9 | 85 |
| | 2000 | 200 | ~3 | 725 | 1 to 2 | ~9 | 88 |
| ~1.9 | 2000 | 110 | 6.5 | 707 | 1 to 2 | ~9 | 98 |

[#]Dragger Tube

TABLE 2

Trial No. 98
WATER WASH

| CO2 v/v % | [NH3]g inlet[#] ppmv | [NH3]g outlet[#] ppmv | Liquid Flow lpm | Gas Flow acfm | Water Temp (C.) | delta P WW inch-water | Run Time min |
|---|---|---|---|---|---|---|---|
| 2.4 | 4000 | 1596* | 5.5 | 730-740 | 4-5 | 9-10 | 27 |
| 2.4 | 4000 | 1229* | 5.5 | 730-740 | 4-5 | 9-10 | 29 |
| 2.4 | 3500 | 976*, 600 | 5.5 | 730-740 | 4-5 | 9-10 | 35 |
| 2.4 | 3500 | 752*, 450 | 5.5 | 730-740 | 4-5 | 9-10 | 42 |
| 2.4 | 3000 | 644*, 350 | 5.5 | 730-740 | 4-5 | 9-10 | 52 |
| 2.4 | 2900 | 353*, 325 | 5.5 | 730-740 | 4-5 | 9-10 | 62 |
| 2.4 | 2900 | 260 | 5.5 | 730-740 | 4-5 | 9-10 | 75 |

[#]Dragger Tube
*FTIR

TABLE 3

Trial No. 99
WATER WASH

| CO2 v/v % | [NH3]g inlet[#] ppmv | [NH3]g outlet[#] ppmv | Liquid Flow lpm | Gas Flow acfm | Water Temp (C.) | Change in Pressure (delta P) Water Wash inch-water | Run Time min |
|---|---|---|---|---|---|---|---|
| 2.4 | 2200 | 766*, 400 | 3.7 | 730-735 | 2-3 | 9-10 | 10 |
| 2.4 | 2200 | 400*, 400 | 4.0 | 730-735 | 2 | 9-10 | 18 |
| 2.4 | 2000 | 355*, 300 | 4.0 | 730-735 | 2 | 9-10 | 27 |
| 2.4 | 1950 | 400*, 350 | 1.8 | 730-735 | 1 | 9-10 | 45 |
| 2.4 | 1900 | 423*, 400 | 1.8 | 730-735 | 1 | 9-10 | 50 |
| 2.4 | 1850 | 440*, 400 | 1.8 | 730-735 | 1 | 9-10 | 59 |
| 2.4 | 1800 | 450*, 400 | 1.8 | 730-735 | 1 | 9-10 | 69 |
| 2.4 | 1750 | 235*, 210 | 3.7 | 730-735 | 2-3 | 9-10 | 81 |
| 2.4 | 1650 | 220*, 220 | 3.7 | 730-735 | 2-3 | 9-10 | 89 |
| 2.4 | 1600 | 100* | 6.6 | 730-735 | 3 | 9-10 | 98 |
| 2.4 | 1500 | 76*, 80 | 6.6 | 730-735 | 3 | 9-10 | 107 |

[#]Dragger Tube
*FTIR

TABLE 4

Trial No. 100
WATER WASH

| CO2 v/v % | [NH3]g inlet[#] ppmv | [NH3]g outlet[#] ppmv | Liquid Flow lpm | Gas Flow acfm | Water Temp (C.) | delta P WW inch-water | Run Time min |
|---|---|---|---|---|---|---|---|
| 2.4 | 1200 | 198*, 160 | 2 | 750 | 1-2 |  | 22 |
| 2.4 | 1200 | 128 | 4 | 750 | 1-2 | 7.5 | 34 |
| 2.4 | 1200 | 55 | 6.5 | 750 | 1-2 | 8 | 47 |

[#]Dragger Tube
*FTIR

In tables 1-4, the ammonia inlet and ammonia outlet refer to the concentration of ammonia in the ammonia-containing flue gas stream entering the wash vessel and the reduced ammonia containing flue gas stream exiting the wash vessel. The change in pressure (delta P) is the pressure drop measured across the wash vessel. "ACFM" refers to actual cubic feet per minute, which is the volumetric flow rate of the flue gas stream at the actual pressure and temperature. The "water temp" refers to the water used in the wash vessel, the "liquid flow" refers to flow rate of the water in the wash vessel and the "gas flow" refers to the flow rate of the flue gas stream through the wash vessel.

Example 2

Three trials (101, 102, and 103) are conducted to test the performance of a system utilizing a wash vessel having 2-inch (about 5.1 cm) random Jaeger packing (available from Jaeger Products Inc., Houston, Tex., United States) in the first absorption stage of a wash vessel, similar to first absorption stage 181a in a wash vessel 180 shown in FIG. 3. The results are given in Tables 5-7.

During these runs, inlet ammonia concentration varies from between thirteen hundred and four thousand parts per million (1300-4000 ppm) at a 800-833 standard cubic feet per minute (scfm) corresponding to about 8 feet per second gas. The concentration of $CO_2$ in the air is 0-2.3 v/v %. The scrubbing water temperature is 3-9° C., and the water flow rates are 2, 4, and 6 lpm.

TABLE 5

Summary data from Run No. 101
WATER WASH

| CO2 v/v % | [NH3]g inlet[#] ppmv | [NH3]g outlet[#] ppmv | Liquid Flow lpm | Gas Flow acfm(scfm) | Water Temp (C.) | delta P WW inch-water | Liquid at the bottom ° C. | Air In/out ° C. |
|---|---|---|---|---|---|---|---|---|
| 2.2 | 2800 | 700, 750* | 2 | 692 (806) | 3.5 | >5 | 2.6 | 3.7/6.2 |
| 2.2 | 2800 | 225 | 4 | 714 (811) | 4.9 | >5 | 2.7 | 3.6/6.9 |
| 2.2 | 2800 | 98 | 6 | 714 (811) | 3.0 | >5 | 3.5 | 4.1/5.9 |

*FTIR readings
[#]Dragger tube readings

TABLE 6

Summary data from Run No. 102
WATER WASH

| CO2 v/v % | [NH3]g inlet[#] ppmv | [NH3]g outlet[#] ppmv | Liquid Flow lpm | Gas Flow acfm(scfm) | Water Temp (C.) | delta P WW inch-water | Liquid at the bottom ° C. | Air In/out ° C. |
|---|---|---|---|---|---|---|---|---|
| 2.2 | 2000 | 630* | 2 | 719 (~800) | 7.7 | >5 | 9.2 | 9.5/11.5 |
| 2.2 | 2000 | 285* | 4 | 718 (829) | 7.8 | >5 | 9.2 | 9.7/11 |
| 2.2 | 2000 | 98* | 6 | 714 (823) | 8.1 | >5 | 9.2 | 9.8/11 |
| 2.2 | 1400 | 320* | 2 | 711 (~820) | 3.6 | >5 | 5.8 | 6.3/8.4 |
| 2.2 | 1300 | 80* | 4 | 711 (811) | 3.5 | >5 |  |  |
| 2.2 | 1300 | 68* | 6 | 711 (~820) | 3.5 | >5 | 5.5 | 5.8/7.4 |
| 0 | 1350 | 400* | 4 | 704 (802) | 4.1 | >5 | 5.1 | 5.5/7.0 |

*FTIR readings
[#]Dragger tube readings

TABLE 7

Summary data from Run No. 103
WATER WASH

| CO2 v/v % | [NH3]g inlet[#] ppmv | [NH3]g outlet[#] ppmv | Liquid Flow lpm | Gas Flow acfm(scfm) | Water Temp (C.) | delta P WW inch-water | Liquid at the bottom ° C. | Air In/out ° C. |
|---|---|---|---|---|---|---|---|---|
| 2.3 | 4000 | 1458* | 2 | 742 (833) | 5.1 | >5 | 7.7 | 9.5/10.6 |
| 2.3 | 4000 | 670* | 4 | 743 (833) | 5.3 | >5 | 7.1 | 8.8/9.7 |
| 2.3 | 4000 | 355* | 6 | 740 (~830) | 4.9 | >5 | 7.1 | 8.5/9.8 |

*FTIR readings
[#]Dragger tube readings

In tables 5-7, the ammonia inlet and ammonia outlet refer to the concentration of ammonia in the ammonia-containing flue gas stream entering the wash vessel and the reduced ammonia containing flue gas stream exiting the wash vessel. The change in pressure (delta P) is the pressure drop measured across the wash vessel. "ACFM" refers to actual cubic feet per minute, which is the volumetric flow rate of the flue gas stream at the actual pressure and temperature. The "water temp" refers to the water used in the wash vessel, the "liquid flow" refers to flow rate of the water in the wash vessel and the "gas flow" refers to the flow rate of the flue gas stream through the wash vessel.

Example 3

Three trials (104, 105, and 106) are conducted to measure the effectiveness of wood packing as the mass transfer device in the wash vessel to remove ammonia from an ammonia-containing flue gas stream containing 600 to 3500 ppm ammonia and 0-2.3 v/v % $CO_2$. The temperature of the water is 2-7° C. During most of these tests, the gas flow rate is kept in the range 730 to 750 scfm, and the outlet ammonia concentration is measured under varying water flow rates (2, 4, 6 lpm). Summary of the results are given in Table 8.

TABLE 8

Summary data from Trials 104, 105 and 106
WATER WASH

| CO2 v/v % | [NH3]g inlet[#] ppmv | [NH3]g outlet[#] ppmv | Liquid Flow lpm | Gas Flow acfm(scfm) | Water Temp (C.) | delta P WW inch-water | Liquid at the bottom ° C. | Air In/out ° C. |
|---|---|---|---|---|---|---|---|---|
| Run No. 104 | | | | | | | | |
| 0 | 600 | 425* | 2 | 700 (~730) | 4.9 | 1.7 | 4.4 | 4.0/7.4 |
| 0 | 600 | 280* | 4 | 700 (~730) | 3.3 | 2.2 | 4.0 | 4.0/6.1 |
| 0 | 600 | 180* | 6 | 699 (~730) | 3.3 | 2.3 | 4.3 | 4.1/5.9 |
| 0 | 1500 | 1000* | 2 | 699 (~730) | 3.9 | 1.8 | 4.4 | 4.3/6.4 |
| 0 | 1500 | 650* | 4 | 699 (~730) | 3.4 | — | 4.1 | 3.9/5.8 |
| 0 | 1500 | 400* | 6 | 699 (~730) | 2.8 | 2.4 | 4.2 | 5.0/6.0 |
| 0 | 3500 | 1900* | 2 | 699 (~730) | 2.5-3.5 | 2.1 | — | — |
| 0 | 3500 | 1450 | 4 | 699 (~730) | 2.5-3.5 | 2.3 | — | — |
| 0 | 3500 | 988 | 6 | 699 (~730) | 2.5-3.5 | 2.4 | — | — |
| 2.3 | 3000 | 1250 | 2 | 720 (~754) | 4.3 | 1.9 | 5.9 | 6.5/8.1 |
| 2.3 | 3000 | 520 | 4 | 720 (~754) | 4.0-4.5 | — | — | — |
| 2.3 | 3000 | 480 | 6 | 720 (~754) | 4.0-4.5 | — | — | — |
| 0 | 3000 | 1255 | 6 | 720 (~754) | 4.0-4.5 | — | — | — |
| 2.3 | 3000 | 1067 | 2 | 720 (~754) | 4.0-4.5 | 2.3 | — | — |
| 2.3 | 3000 | 609 | 4 | 720 (~754) | 4.0-4.5 | 2.4 | — | — |
| 2.3 | 3000 | 440 | 6 | 720 (~754) | 4.0-4.5 | 2.6 | — | — |
| 2.3 | 1400 | 500 | 2 | 720 (~754) | 4.0-4.5 | 2.3 | — | — |
| 2.3 | 1400 | 317 | 4 | 720 (~754) | 4.0-4.5 | — | — | — |
| 2.3 | 1400 | 160 | 6 | 720 (~754) | 4.0-4.5 | — | — | — |
| Run No. 105 | | | | | | | | |
| 2.2 | 2000 | 850* | 2 | 716 (745) | 6.5 | 2.0 | 8 | 7/11.9 |
| 2.2 | 2000 | 850* | 2 | 716 (745) | — | — | — | — |
| 2.2 | 2000 | 723* | 2 | 716 (745) | 4.3 | — | 5.2 | 5.6/7.7 |
| 2.2 | 2100 | 840* | 2 | 716 (745) | — | — | — | — |
| 2.2 | 2000 | 723* | 2 | 716 (745) | — | — | — | — |
| 2.2 | 2000 | 715 | 2 | 716 (745) | — | — | — | — |
| 2.2 | 2000 | 475 | 4 | 716 (745) | — | — | — | — |
| 2.2 | 2000 | 280 | 6 | 716 (745) | — | — | — | — |
| 2.2 | 2000 | 619 | 2 | 715 (745) | — | — | — | — |

TABLE 8-continued

Summary data from Trials 104, 105 and 106
WATER WASH

| CO2 v/v % | [NH3]g inlet[#] ppmv | [NH3]g outlet[#] ppmv | Liquid Flow lpm | Gas Flow acfm(scfm) | Water Temp (C.) | delta P WW inch-water | Liquid at the bottom ° C. | Air In/out ° C. |
|---|---|---|---|---|---|---|---|---|
| 2.2 | 2000 | 564 | 2 | 606 (617) | — | — | — | — |
| 2.2 | 2000 | 347 | 2 | 423 (427) | — | — | — | — |
| 2.2 | 1700 | 655 | 2 | 702 (732) | — | — | — | — |
| Run No. 106 | | | | | | | | |
| 2.2 | 500* | 200* | 2 | 716 (745) | 3.5 | 2.3 | 5.6 | 5.9/9.1 |
| 2.2 | 500* | 55* | 6 | 716 (745) | 3.7 | 2.7 | 5.6 | 6.2/7.1 |

*FTIR readings
[#]Dragger tube readings

In table 8, the ammonia inlet and ammonia outlet refer to the concentration of ammonia in the ammonia-containing flue gas stream entering the wash vessel and the reduced ammonia containing flue gas stream exiting the wash vessel. The change in pressure (delta P) is the pressure drop measured across the wash vessel. "ACFM" refers to actual cubic feet per minute, which is the volumetric flow rate of the flue gas stream at the actual pressure and temperature. The "water temp" refers to the water used in the wash vessel, the "liquid flow" refers to flow rate of the water in the wash vessel and the "gas flow" refers to the flow rate of the flue gas stream through the wash vessel.

The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for reducing an amount of ammonia in a flue gas stream, the system comprising:
a wash vessel including:
a first input opening to receive an ammonia-containing flue gas stream;
a first absorption stage and a second absorption stage disposed above the first input opening, each of the first absorption stage and the second absorption stage having a mass transfer device, wherein the first absorption stage is disposed above the second absorption stage, each of the mass transfer devices of the first absorption stage and the second absorption stage includes a type of packing material selected from structural packing material, hydrophilic packing material or random packing material; and the mass transfer device of the first absorption stage is of a different type of packing material than the mass transfer device of the second absorption stage;
a second input opening disposed above the first absorption stage and the second absorption stage, wherein the second input opening receives a liquid which flows downward in counter current direction to the ammonia containing flue gas sequentially through the first absorption stage and the second absorption stage for absorbing ammonia from the ammonia-containing flue gas stream, thereby forming an ammonia-rich liquid and a reduced ammonia containing flue gas stream exiting the wash vessel; and
a third input opening disposed below the first absorption stage and above the second absorption stage, wherein the third input opening receives a liquid which flows downward in counter current direction to the ammonia containing flue gas sequentially through the second absorption stage for absorbing ammonia from the ammonia-containing flue gas stream.

2. The system according to claim 1, wherein the mass transfer device in the first absorption stage includes random packing material and the mass transfer device in the second absorption stage includes structural packing material.

3. The system according to claim 1,
wherein each of the first absorption stage and the second absorption stage comprises:
a spray head system, in fluid communication with the respective second input opening and third input opening, providing the liquid to the first absorption stage and second absorption stage, respectively, wherein the liquid flows in a direction along a length of the wash vessel countercurrent to a direction of the ammonia-containing flue gas stream along the length of the wash vessel.

4. The system according to claim 1, further comprising a stripping column for receiving the ammonia-rich liquid and regenerating the ammonia-rich liquid to form the liquid provided to the second input opening for absorbing ammonia from the ammonia-containing flue gas.

5. The system according to claim 1 wherein the mass transfer device in the first absorption stage includes structural packing material and the mass transfer device in the second absorption stage includes random packing material.

6. A system for reducing an amount of ammonia in a flue gas stream, the system comprising:
an absorbing system having one or more absorbers to absorb carbon dioxide ($CO_2$) from a cooled flue gas stream having a temperature below ambient temperature, the absorbing system operates at a temperature between 0° and 20° Celsius, wherein at least a portion of the $CO_2$ is absorbed by an ammoniated solution or slurry thereby producing an ammonia-containing flue gas stream; and a wash vessel configured to receive at least a portion of the ammonia-containing flue gas stream, the wash vessel includes a first absorption stage and a second absorption stage, the first absorption stage being disposed above the second absorption stage and each of the absorption stages having a respective spray head system and a mass transfer device having a type of packing material selected from random packing material, hydrophilic packing material, and structural packing material, wherein the mass transfer device of the first absorption stage is of a different type of packing material than the mass transfer device of the second absorption stage, wherein each spray head system directs a liquid in a direction countercurrent to a direction of the ammonia-containing flue gas stream passing through each respective first absorption stage and second absorption stage, the liquids absorbing ammonia from the ammonia-containing flue gas stream and thereby forming an ammonia-rich liquid and a reduced-ammonia flue gas stream, whereby at least a portion of ammonia present in the ammonia-containing flue gas stream is removed from the ammonia-containing flue gas stream in the first absorption stage and the second absorption stage of the wash vessel.

7. The system according to claim 6, wherein the first absorption stage includes random packing material as the mass transfer device; and the second absorption stage includes structural packing as the mass transfer device.

8. The system according to claim 6 further comprising a stripping column for receiving the ammonia-rich liquid and regenerating the ammonia-rich liquid to form the liquid for absorbing ammonia from the ammonia-containing flue gas stream.

9. A system for reducing an amount of ammonia in a flue gas stream, the system comprising:
   an absorbing system having one or more absorbers to absorb carbon dioxide ($CO_2$) from a flue gas stream, wherein at least a portion of the $CO_2$ is absorbed by an ammoniated solution or slurry thereby producing an ammonia-containing flue gas stream; and
   a wash vessel including:
      an input opening to receive an ammonia-containing flue gas stream;
      a first absorption stage and a second absorption stage disposed above the first input opening, each of the first absorption stage and the second absorption stage having a mass transfer device, wherein the first absorption stage is disposed above the second absorption stage; and
      a second input opening disposed above the first absorption stage and the second absorption stage, wherein the second input opening receives a liquid which flows downward in counter current direction to the ammonia containing flue gas sequentially through the first absorption stage and the second absorption stage for absorbing ammonia from the ammonia-containing flue gas stream, thereby forming an ammonia-rich liquid and a reduced ammonia containing flue gas stream exiting the wash vessel; and
      a third input opening disposed below the first absorption stage and above the second absorption stage, wherein the third input opening receives the liquid which flows downward in counter current direction to the ammonia containing flue gas sequentially through the second absorption stage for absorbing ammonia from the ammonia-containing flue gas stream;
      wherein at least a portion of the liquids passing through one or both the first absorption stage and the second absorption stage is provided to a fluid conduit that provides such liquids rich in ammonia to the third input opening.

10. The system according to claim 9, wherein the mass transfer device of the first absorption stage and the second absorption stage includes a type of packing material selected from a structural packing material, hydrophilic packing material or a random packing material.

11. The system according to claim 10, wherein the mass transfer device of the first absorption stage is of a different type of packing material than the mass transfer device of the second absorption stage.

12. The system according to claim 10, wherein the packing material in the first absorption stage includes random packing material and the packing material in the second absorption stage includes structural packing material.

13. The system according to claim 9,
   wherein each of the first absorption stage and the second absorption stage comprises:
      a spray head system, in fluid communication with the respective second input opening and third input opening, providing the liquid to the first absorption stage and the second absorption stage, respectively, wherein the liquid flows in a direction along a length of the wash vessel countercurrent to a direction of the ammonia-containing flue gas stream along the length of the wash vessel.

14. A system for reducing an amount of ammonia in a flue gas stream, the system comprising:
   a wash vessel including:
      an first input opening to receive an ammonia-containing flue gas stream;
      a first absorption stage and a second absorption stage disposed above the first input opening, each of the first absorption stage and the second absorption stage having a mass transfer device, wherein the first absorption stage is disposed above the second absorption stage; and
      a second input opening disposed above the first absorption stage and the second absorption stage, wherein the second input opening receives a liquid which flows downward in counter current direction to the ammonia containing flue gas sequentially through the first absorption stage and the second absorption stage for absorbing ammonia from the ammonia-containing flue gas stream, thereby forming an ammonia-rich liquid and a reduced ammonia containing flue gas stream exiting the wash vessel; and
      a third input opening disposed below the first absorption stage and above the second absorption stage, wherein the third input opening receives the liquid which flows downward in counter current direction to the ammonia containing flue gas sequentially through the second absorption stage for absorbing ammonia from the ammonia-containing flue gas stream;
      wherein at least a portion of the liquids passing through one or both the first absorption stage and the second absorption stage is provided to a fluid conduit that provides such liquids rich in ammonia to the third input opening.

15. The system according to claim 14, wherein each of the first absorption stage and the second absorption stage comprises:
   a spray head system, in fluid communication with the respective second input opening and third input opening, providing the liquid to the first absorption stage and the second absorption stage, respectively, wherein the liquid flows in a direction along a length of the wash vessel countercurrent to a direction of the ammonia-containing flue gas stream along the length of the wash vessel.

16. A system for reducing an amount of ammonia in a flue gas stream, the system comprising:

a wash vessel including:

a first input opening to receive an ammonia-containing flue gas stream;

a first absorption stage and a second absorption stage disposed above the first input opening, each of the first absorption stage and the second absorption stage having a mass transfer device, wherein the first absorption stage is disposed above the second absorption stage, each of the mass transfer devices of the first absorption stage and the second absorption stage includes a type of packing material selected from structural packing material, hydrophilic packing material or random packing material; and the mass transfer device of the first absorption stage is of a different type of packing material than the mass transfer device of the second absorption stage; and a second input opening disposed above the first absorption stage and the second absorption stage, wherein the second input opening receives a liquid which flows downward in counter current direction to the ammonia containing flue gas sequentially through the first absorption stage and the second absorption stage for absorbing ammonia from the ammonia-containing flue gas stream, thereby forming an ammonia-rich liquid and a reduced ammonia containing flue gas stream exiting the wash vessel; and a third input opening for receiving a another liquid for absorbing ammonia from the ammonia-containing flue gas stream;

wherein each of the first absorption stage and the second absorption stage comprises:

a spray head system, in fluid communication with the respective second input opening and third input opening, directing the liquid in a direction along a length of the wash vessel countercurrent to a direction of the ammonia-containing flue gas stream along the length of the wash vessel.

* * * * *